(No Model.)
F. JARRETT.
CATTLE STALL.
No. 579,484. Patented Mar. 23, 1897.
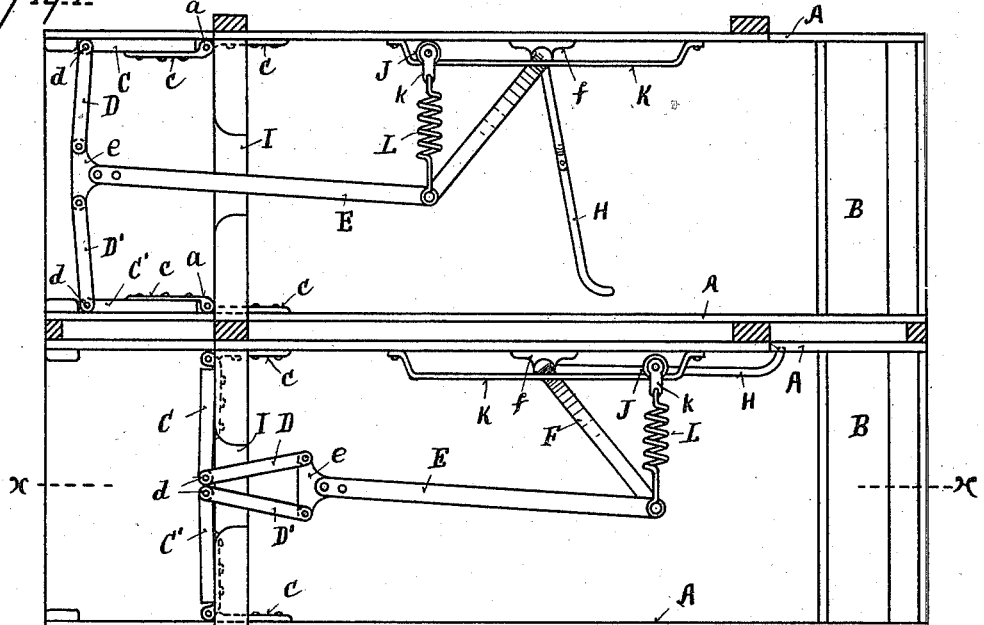
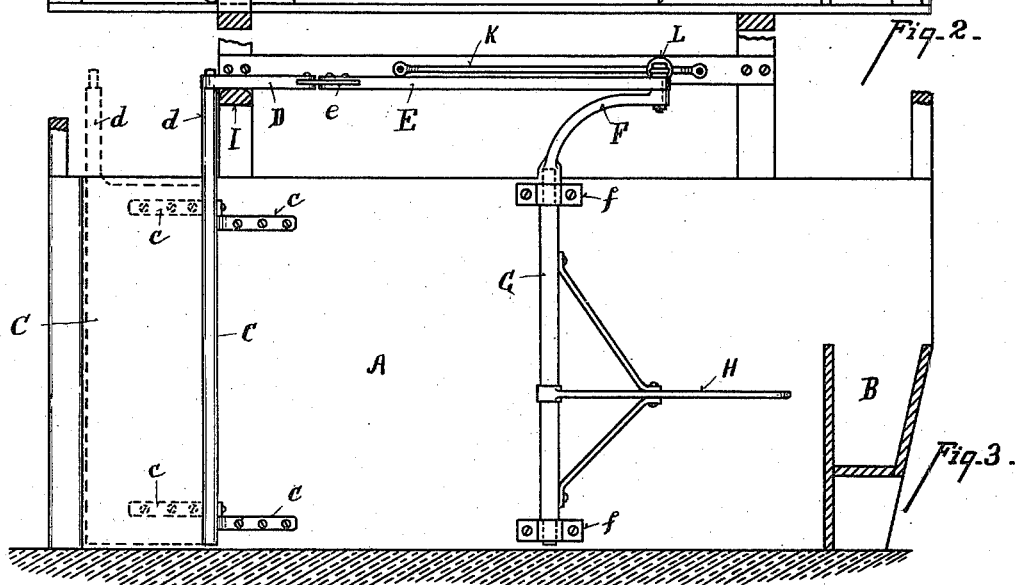
Witnesses
C. W. Miles
H. Mueller
Inventor
Floyd Jarrett
by Wood & Boyd
Attorneys

UNITED STATES PATENT OFFICE.

FLOYD JARRETT, OF RICHLANDS, WEST VIRGINIA.

CATTLE-STALL.

SPECIFICATION forming part of Letters Patent No. 579,484, dated March 23, 1897.

Application filed July 20, 1896. Serial No. 599,917. (No model.)

*To all whom it may concern:*

Be it known that I, FLOYD JARRETT, residing at Richlands, in the county of Greenbrier and State of West Virginia, have invented certain new and useful Improvements in Cattle-Stalls, of which the following is a specification.

The object of my invention is to provide a feeding-stall for cattle, so constructed that the doors thereof are automatically closed by the entrance of an animal into the stall and which cannot be opened or the stall interfered with by another animal from the outside, but is readily opened by the animal when it desires to go out.

The features of my invention are more fully set forth in the description of the accompanying drawings, making a part of this specification, in which—

Figure 1 is a top plan view of my improved stall, showing the position of the parts when the doors are open. Fig. 2 is a similar view showing the position of the parts when the doors are closed. Fig. 3 is a central vertical section on line $x$ $x$, Fig. 2.

A represents the sides of the stall.

B represents the feed-trough.

C C' represent the doors, which are hinged at $a$ to the sides of the stall, and which when closed span the entrance. The doors are arranged to open outward, as shown in dotted line, Fig. 3, so as to allow the animal to pass freely into the stall, and to open the same, as hereinafter explained, when the animal desires to leave.

$c$ represents strap-hinges, which are preferably employed on account of their strength.

$d$ represents a bracket or post extending upward from the top of each door.

D D' represent links hinged at one end to the bracket $d$ and at the opposite end to a connecting-rod E, preferably by means of a tongue or bracket $e$, which is rigidly connected to the connecting-rod E.

F represents a crank-arm hinged at one end to the connecting-rod and at the other end rigidly connected to a journal-rod G, journaled in brackets $f$, fastened to the sides of the stall.

H represents a lever rigidly connected to the rod G. These parts are so arranged that the lever H projects across the stall when the doors are open and is moved to one side by the animal in his efforts to reach the feed-trough at the other end of the stall.

I represents a cross-piece on the top of the stall near the rear end thereof. This cross-piece, in addition to bracing the stall, serves first as a support for the links D D' and the connecting-rod E in their forward and backward movements. I also prefer to place this cross-piece in such a position that the bracket or projection $d$ will rest against it when the gates are closed and serve as stops to prevent the doors from further inward movement by an animal from the outside. Thus it is impossible for a second animal to enter after a first animal has entered and closed the doors.

In order that the doors may be opened or closed easily by a small effort of the animal, I provide the following tension instrumentalities to complete the movement of opening and closing the doors.

J represents a traveling pulley supported upon the guide K.

$k$ represents brackets which serve as supports for the journal of the pulley and also a point to which to attach and anchor a spring L. Said spring is double-acting and is shown in its strained position in Fig. 2. A movement to or from that position will recoil the spring and act upon the crank-arm F, and said spring insures the complete movement of the doors both in opening and closing the same.

Mode of operation: It will be observed that the attendants can open or close the doors at will, and when the feed is placed in the stall the doors are set in the open position. As the animal enters the stall his breast will strike the lever H and move it forward and bring the spring L into action, which will complete the closing of the door. The lever will fold up at one side of the stall completely out of the way. It will be observed that the stalls are not sufficiently wide to allow the animal to turn around, and after it has completed its feed it will back out, as is characteristic of all cattle, and its backside will strike the doors and move them readily open, as before explained, allowing the animal to pass freely out.

This stall may be roofed and serve as a shed as well as a feed-stall. I have found by experience that the animals readily learn the use of the stalls and enter and leave them either for feed or shelter. Thus a system of shedding and feeding stalls combined are very cheaply made, and they possess many superior advantages over the permanent sheds and stalls hitherto used, as it allows the animal to enter and leave the stall at will, and hence it leaves the animal to go to water and return without requiring an attendant.

Another advantage is that a series of these stalls used with a herd each animal is protected from the other animals and is secure for resting or feeding.

There are various other advantages which will be readily seen.

Having described my invention, what I claim is—

1. The combination with a cattle-stall having inwardly-closing doors, of door-operating mechanism consisting of a vertical rod and links connecting said rod to the doors, and a crank-lever connected to said rod and projecting across the stall opposite the breast of the animal entering, whereby the doors are automatically opened and closed by the entrance and exit of the animal from the stall, substantially as specified.

2. The combination with a cattle-stall having an inwardly-closing door, of door-operating mechanism comprising a lever projecting across the stall when the door is open, the position of said lever being such that it will be pushed to one side by an animal entering the stall, thereby closing the stall-door, and a traveling tension device connected with said door-operating mechanism to assist in opening and closing the door easily, substantially as described.

3. The combination with a cattle-stall having one or more inwardly-closing doors, of a vertical rod journaled in one side of the stall and provided with a rigidly-attached operating-lever and a rigidly-attached crank-arm, a connecting-rod attached to said crank-arm, and a link or links attached to said connecting-rod and to the door or doors, the said operating-lever being arranged to project across the stall when the doors are open and adapted to be pushed to one side by an animal entering the stall and thereby closing the doors, substantially as described.

4. The combination with a cattle-stall having one or more inwardly-closing doors, of door-operating mechanism comprising a lever projecting across the stall when the doors are open and adapted to be pushed to one side by an animal entering the stall, thereby closing the stall-door, stop mechanism to limit the inward movement of the doors, and a tension device connected with said door-operating mechanism to facilitate the opening and closing of the stall-doors, substantially as described.

5. The combination with a cattle-stall provided with the doors C C', of the vertically-journaled rod G provided with rigidly-attached crank-arm F and rigidly-attached lever H, the connecting-rod E attached to said crank-arm, the links D D' attached to said connecting-rod and to the doors, the spring L connected with the crank-arm, the pulley J attached to said spring, and the guideway K for said pulley, substantially as described.

In testimony whereof I have hereunto set my hand.

FLOYD JARRETT.

Witnesses:
W. R. WOOD,
OLIVER B. KAISER.